Jan. 8, 1963        A. R. GUNNERT        3,071,963
METHOD OF MEASURING STRESSES IN THE INTERIOR OF A MATERIAL
Original Filed Oct. 21, 1957        5 Sheets-Sheet 1
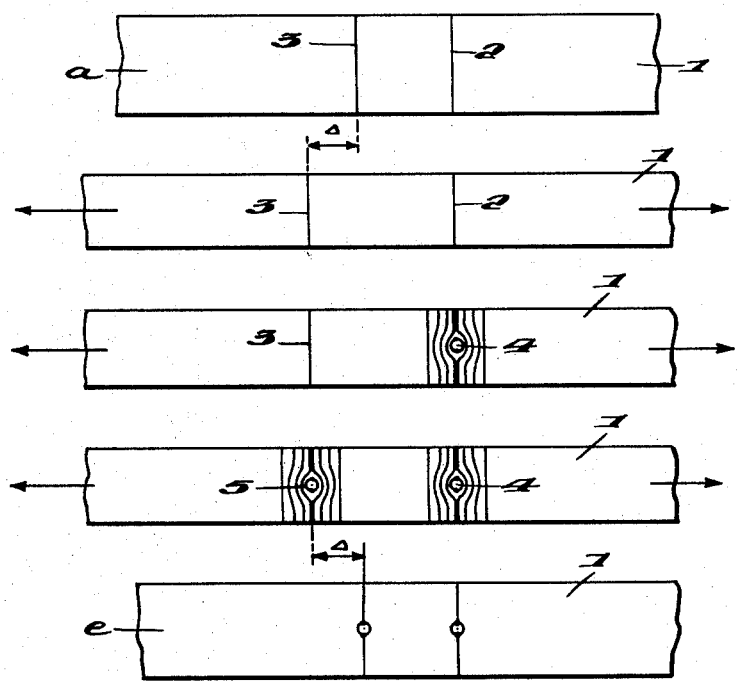
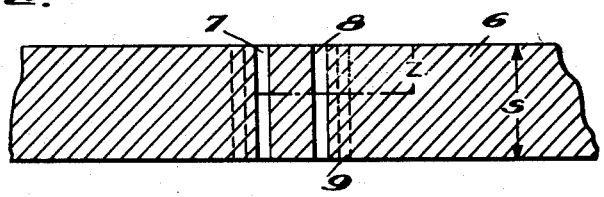
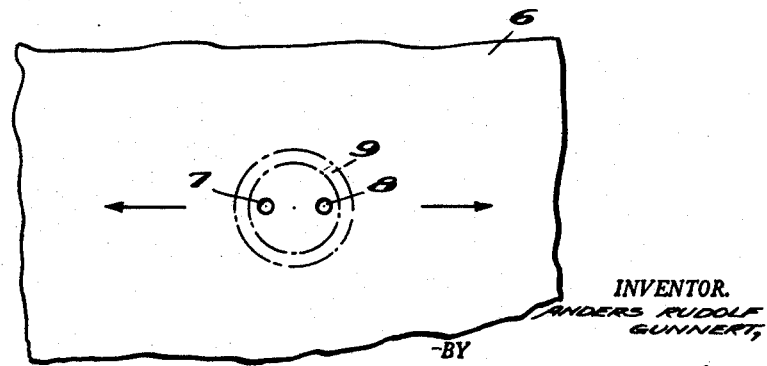
INVENTOR.
ANDERS RUDOLF GUNNERT,
BY Larson and Taylor
ATTORNEYS INVENTOR.
ANDERS RUDOLF GUNNERT
Larson and Taylor
ATTORNEYS Jan. 8, 1963 A. R. GUNNERT 3,071,963
METHOD OF MEASURING STRESSES IN THE INTERIOR OF A MATERIAL
Original Filed Oct. 21, 1957 5 Sheets-Sheet 3

INVENTOR.
ANDERS RUDOLF GUNNERT,
BY
ATTORNEYS

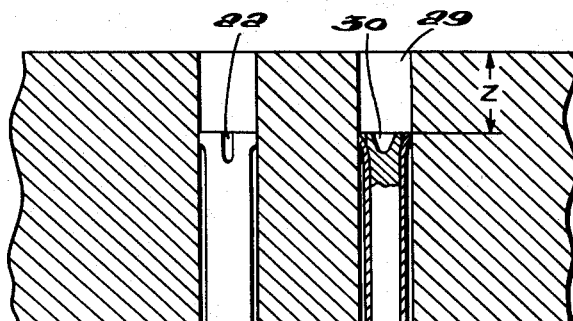
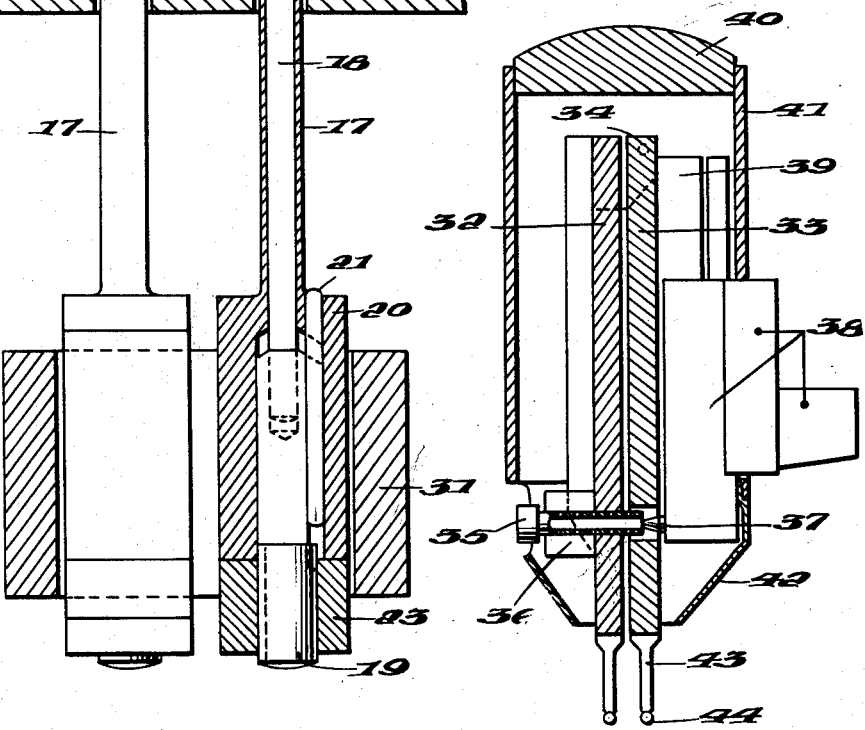
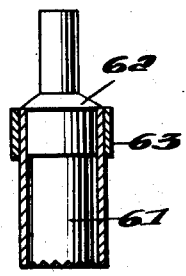

Jan. 8, 1963 — A. R. GUNNERT — 3,071,963
METHOD OF MEASURING STRESSES IN THE INTERIOR OF A MATERIAL
Original Filed Oct. 21, 1957 — 5 Sheets-Sheet 5
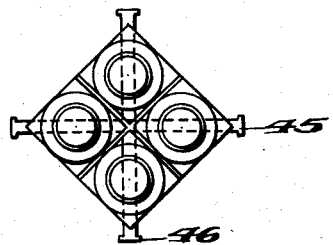
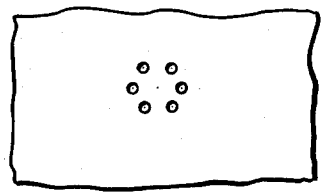
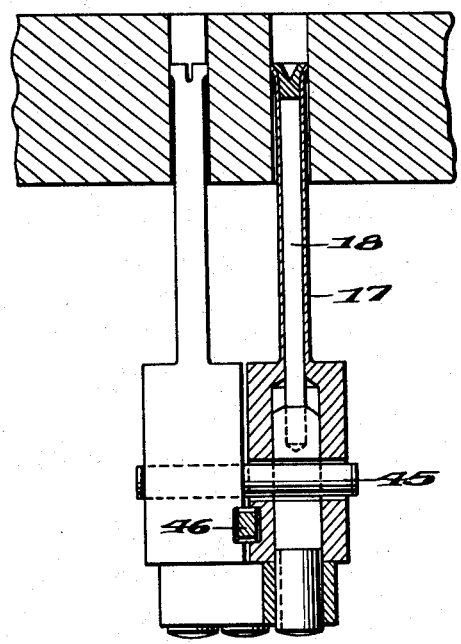
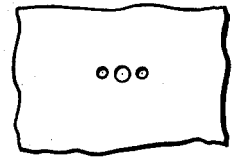
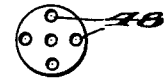
INVENTOR.
ANDERS RUDOLF GUNNERT
BY
Larson and Taylor
ATTORNEYS United States Patent Office 3,071,963
Patented Jan. 8, 1963

3,071,963
METHOD OF MEASURING STRESSES IN THE INTERIOR OF A MATERIAL
Anders Rudolf Gunnert, Lidingo, Sweden, assignor to Svenska Aktiebolaget Gasaccumulator, Lidingo, near Stockholm, Sweden, a corporation of Sweden
Original application Oct. 21, 1957, Ser. No. 691,488. Divided and this application Sept. 16, 1959, Ser. No. 846,222
2 Claims. (Cl. 73—88)

This is a divisional application of copending application Serial No. 691,488, filed Oct. 21, 1957, now abandoned.

The present invention refers to a method of measuring stresses in the interior of a material and particularly for measuring the inherent stresses of welded objects.

While earlier attempts have been made to measure the inherent stresses present in a material, they have been complicated and therefore were not adaptable for actual measurements on practical objects. Often uncertain results would be obtained or be usable only in particular cases. When using the method of the present invention, however, it is possible to determine accurately the actual magnitude of stresses in the interior of the material and to perform the measurement with so little damage to the measured object that the method can be applied to objects in actual use without causing any real damage.

According to the present invention, the method of measuring stresses present in a stress field is characterized by forming at least two substantially parallel holes in the stress field and measuring the distance between these holes at the surface at different levels below the surface before and after a change in stress has been applied to the stress field. A more detailed description of the method in question and of an apparatus for performing it will be given below.

Figure 10:
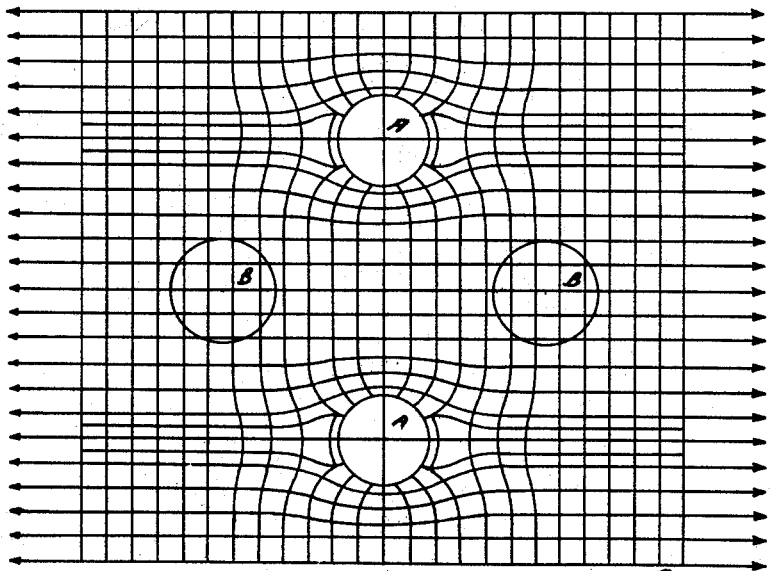
Figure 11:
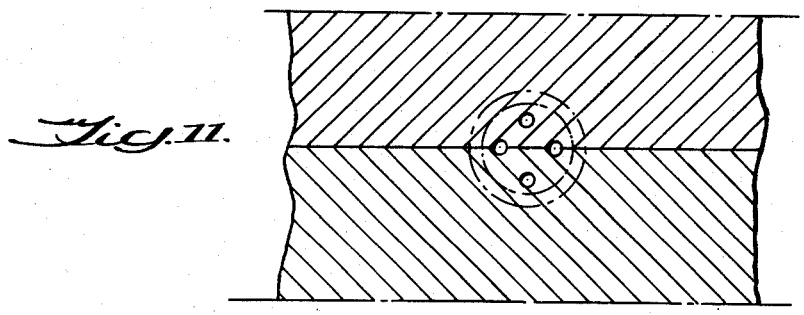
Figure 12:
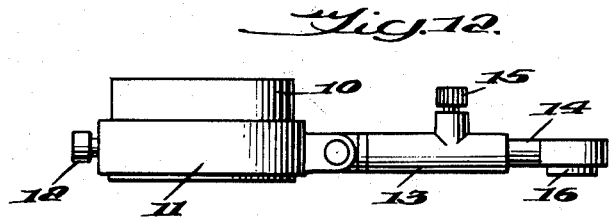
Figure 16:
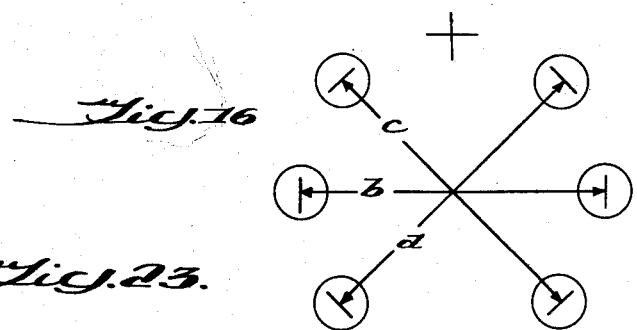
Figure 23:
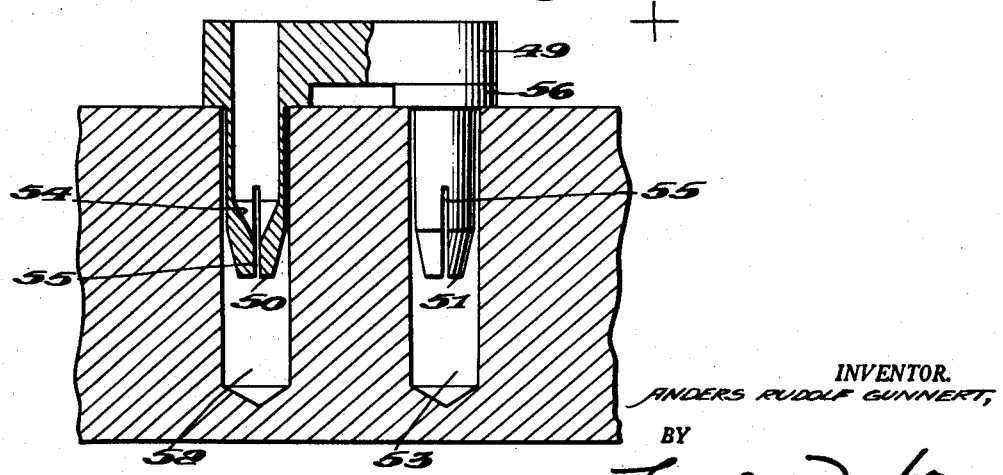

The annexed drawings illustrate the application of the method according to the invention and different embodiments of apparatus therefore. FIG. 1 shows schematically the effect of loading a rubber band and then forming a hole in it. FIGS. 2 and 3 show a sectional and a plan view, respectively, of a material having inherent stresses and the taking of a sample thereof. FIGS. 4 to 9 show schematically in section specimens in their locations in the material and taken out of the material. FIG. 10 shows the direction of the principal stresses around holes drilled in the stress field. FIG. 11 shows a plan view of welded sheet metal provided with holes drilled for the stress measurement. FIG. 12 shows a side view of a drill fixture. FIG. 13 shows in section a workpiece with holes and a supporting device therein. FIG. 14 shows a section through a tensiometer. FIG. 15 shows a drill in axial section. FIG. 16 shows the marking for a check-up measurement. FIGS. 17 and 18 show a modified supporting device in end view and in side view and axial section, respectively. FIGS. 19 and 20 show part of a workpiece in section and in plan view, respectively, and provided with measuring holes. FIG. 21 shows the plan view of a part of a workpiece having holes for measurement and removing of stresses. FIG. 22 shows a specimen taken out of a material. FIG. 23 shows a section of an additional modified supporting device placed in a workpiece for measuring therein. FIG. 24 shows a section through part of the workpiece with holes and the measurements to be performed therein.

An essential fact in connection with the present invention may be illustrated by the rubber band 1 in FIG. 1. Rubber band 1 is marked according to FIG. 1a with transverse lines 2 and 3. A force is applied at each end of the band, so that it is stretched and the spacing between the lines 2 and 3 is increased by the amount $\Delta$, FIG. 1b. A hole 4, which is small relative to the width of the band, is then drilled through the band on the line 2, FIG. 1c. This causes deformation of the band as indicated by arcuate lines in FIG. 1c, and the material in the immediate vicinity of the hole is subjected to an uneven stress distribution. This distribution of stresses, as shown, does not influence the location of the line markings 2 and 3. The material immediately at the periphery of the hole 4 is subject to partially plastic stretching and the remaining material to elastic stretching. A second hole 5 is drilled on the line 3, FIG. 1d. In the same manner, this drilling operation does not influence the spacing of the lines 2 and 3. The forces applied at the ends of the rubber band 1 are then removed. The spacing between the holes 4 and 5 is then diminished by the amount $\Delta$ according to FIG. 1d, i.e., by the amount by which the band was initially stretched. Because of the above mentioned plastic stretching of the material adjacent the periphery of the holes there is a compressive stress present in the material in the immediate vicinity of the holes 4 and 5 but this stress is negligible.

As shown in the above example it is therefore possible to drill a pair of parallel holes in a stressed area, for instance in a weld, without the drilling in itself causing any change in distance between the points at which the holes are drilled. Additionally there is no noticeable influence on the stress conditions if a small diameter hole is used.

The above mentioned conditions are obviously the same on the surface and at levels below the sheet surface.

A practical application of the present measuring method is illustrated in FIGS. 2 and 3. A metal sheet 6 is subjected to stresses, and the problem is to find the magnitude of the stresses in the direction indicated by the arrows at the upper and lower sheet surface and in the material in the portions intermediate these surfaces.

Two parallel holes 7 and 8 are drilled straight through the sheet 6. A hole diameter of 3 millimeters and a spacing of 9 millimeters have been found suitable. The distance between the two holes 7 and 8 is now to be measured with extreme accuracy at a number of levels between $Z=0$ and $Z=S$. Alternatively, and in order to compensate for possible temperature differences, the actual distance need not be measured. Instead the variation of each distance from a given fixed distance, or distance norm may be measured. Suitable levels are $Z=0$, $Z=2$, $Z=4$, $Z=6$ millimeters etc. When all these distances have been measured and noted, the measuring area is then relieved from stresses and the same measurement again repeated for $Z=0$, $Z=2$ etc. up to $Z=S$. The difference between the distances before and after the relief of tension at each level is a measure of the stress removed at that level, i.e., the stress that was present before the relief took place.

The stress relief is obtained by removal of surrounding material from the measuring area. A groove 9 according to the dash lines of FIG. 3 is milled around the measuring area straight through the sheet, whereby a cylinder is obtained which is disconnected from the surrounding area. The approximate assumption is now made that this cylinder is free from stresses. This is true if the stresses at the respective levels did not originally exhibit any variation across the cylinder. This approximation is well justified if the stress does not have sharp variations within the investigated field of stresses. In the latter case, it is of importance to keep the dimensions of the cylinder as small as possible, i.e. to approach a mathematical point. Actually, one measures in fact the stresses that are set up in the cylinder by the surrounding area and which are eliminated by the disconnection of the cylinder from that area.

Figure 4:
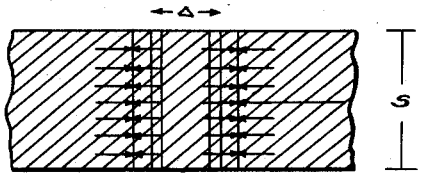
Figure 5:
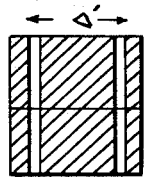

FIGS. 4 to 9 illustrate a schematic view of the deformation of the cylinder from its location in the material as shown in FIG. 4 to its disconnected state shown in FIG. 5. In FIG. 4, the cylinder is integral with the material. The holes piercing it are shown in the drawing.

FIGS. 4 and 5 illustrate conditions for an even distribution of stresses throughout the entire depth of the sheet. After removal by milling the cylindrical shape is retained, but the diameter thereof is increased.

Figure 6:
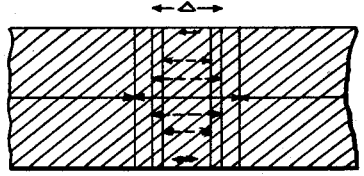
Figure 7:
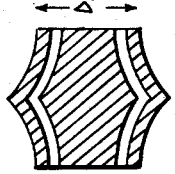

FIGS. 6 and 7 presuppose an uneven distribution of the load, namely an interior force acting on the material. This force gives rise to stresses $\sigma$, as indicated in FIG. 6. The stress is at a maximum opposite to the acting force and falls off towards the surfaces. After the removal of the cylinder from the surrounding material, it swells in proportion to the stresses that are relieved at the respective levels as shown in FIG. 7.

Figure 8:
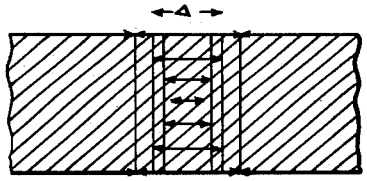
Figure 9:
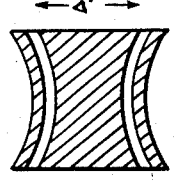

In FIGS. 8 and 9, forces acting on each surface are present. After the relief of the stresses, the cylinder assumes the shape shown in FIG. 9.

If the stress at depth Z is to be computed, the distance change at that level, according to the figures, is $\Delta''-\Delta'$. If now the original distance between the holes was 9 millimetres, the stretching of the material per unit length will be $(\Delta''-\Delta')/9$. Assuming E to be the modulus of elasticity, the stress $\sigma$ is then determined to be $$\sigma = -\frac{\Delta''-\Delta'}{9} E \qquad \text{Equation 1}$$

If forces act simultaneously at the surfaces and in the interior of the material, they are superimposed and the result is a summation of the effects according to FIGS. 6 to 9. Conditions are analogous if a plurality of forces of different magnitudes or directions act on the cylinder.

From the above considerations it is apparent that a cut out cylinder will be deformed in proportion to the stresses from the surrounding material that acted on it before the cutting. This deformation can be ascertained by measurement of the piercing holes at different levels between the surfaces. In the above it was assumed that stresses in the direction of the sheet surface at right angles to the line joining the holes in FIG. 1 are zero. If this, however, is not true, as for instance in a weld, it would conceivably be possible to measure the stresses in this direction at a point sufficiently removed from the point where the stresses in a different direction have been measured earlier for the two milling operations to have no influence on each other. Equal conditions of stress at the two measuring points would then be assumed.

There is, however, a more suitable way of achieving this result.

FIG. 10 shows the stress distribution after an optical tension analysis around a circular hole. For simplicity, the stress is mono-axial and uniformly distributed. In principle, conditions are the same for a bi-axial system of stresses. The holes A are drilled in the stress field. The two families of lines indicate the direction of the principal stresses. As is seen, the drilling of the holes influences stress conditions in the immediate vicinity of the holes. There is apparently no disturbance of the stress conditions between the two dash-dot line holes B. This justifies the assumption that it would be possible to drill four holes at the measuring point in the field of stresses and measure with good approximation the stresses in the two mutually perpendicular directions at a single measuring point. The following example shows that this is possible.

A mathematical treatment of the effect on the distance between the dash-dot holes caused by the drilling of the holes A will not be presented. A calculation indicates a cerain effect in as much as the holes B are somewhat removed from each other but this effect is negligible. It is therefore possible in most cases to adopt the method of making measurements in both directions at the same measuring point. This amounts, then, to drilling four holes at the measuring point and measuring before and after the relief of stresses the distance at different levels between a pair of diagonally placed parallel holes at the measuring point. Preferably, the direction of the diagonals is chosen along the principal stresses, for instance along and across the weld according to FIG. 11.

The above Eq. 1 does not apply to these bi-axial stress conditions. Instead, the following equations hold, in which $\sigma_a$ is the stress in the direction $a$, for instance along a weld, and $\sigma_b$ is in a direction perpendicular thereto. $\Delta_a$ and $\Delta_b$ are the corresponding displacements in thousands of a millimeter.

$$\sigma_a = -2.44(\Delta_a + 0.3\Delta_b)$$
$$\sigma_b = 2.44(\Delta_b + 0.3\Delta_b) \qquad \text{Eq. 2}$$

To obtain good parallelism and accurate fixation of the spacing between the piercing holes, these are drilled in a fixture according to FIG. 12. The fixture is held by the permanent magnet 10, which can be turned in the ring 11 and be locked in a desired position with the aid of the screw 12. An arm 13, which is rotatable in the vertical plane and is provided with a support 14 is mounted on the ring 11. The members 13 and 14 are interlocked by means of the screw 15. A drilling fixture mounted in the support 14 is provided with four holes at a mutual distance of 9 millimeters which guide the drill during the drilling process. When a hole has been drilled, a guide pin is placed through it and through the fixture to hold it securely against lateral displacements.

The distances between these holes are now to be measured at different levels between the sheet surfaces. To this end, a device according to FIG. 13 is placed on one side of the sheet, preferably the underside. The device comprises a tubular portion 17 and a pin 18 slidable therein. Pin 18 has at its lower part a larger threaded portion 19 displaceable in the sleeve 20 forming part of the sleeve 17. Guide pin 21 prevents the parts 17 to 20 from turning relative to each other. The pin 18 is of conical shape at its upper end and the sleeve 17 has at that end one or more slits 22. These constructional features cause the sleeve 17 to expand if the pin 18 is displaced downwardly relative to the sleeve 17. Such displacement can be caused by tightening a nut 23 on the threaded portion 19. The sleeve 17 and the pin 18 are thus locked at a certain level Z against the walls of the hole. The pin 18 has at its upper end a conical depression 30 having a very smooth surface. The arrangement shown in FIG. 13 is seen to comprise two devices of the type described and interconnected by means of a bracket 31 arranged so as to allow mutual displacement of the two devices but no turning thereof. The possibility of a displacement is required, since the parallelism and the distance between the holes cannot be at all times maintained with complete accuracy.

The requirement for the pins 18 and 13 not to be rotatable relative to each other and to the sleeves 17 is derived from the fact that the conical depressions 30 in the pins 18 can never be completely concentric with the periphery of the corresponding pin 18, and in such cases turning of the pins during the measuring processes destroy the result of the measurements.

The distance between the two conical depressions 30 of the two pins 18 is measured with a special tensiometer. Its construction is shown in FIG. 14. A pair of legs 32 and 33 are turnable relative to each other around the point 34. An adjusting screw 35 is threaded into the leg 32 and has a nut 36 attached to it. The flat end of the screw 35 rests against the measuring pin 37 of a sensitive indicator 38. The indicator is attached to the leg 33 by means of a support 39. The parts 40 to 42 form a protective cover. Supports 43 have a diameter about 0.5 millimeter smaller than that of the holes 7 and 8 of FIG. 3 are provided with balls 44 and are attached each to one of the legs 32 and 33. The balls 44 suitably have a diameter of 2 millimeters and are placed in the conical depressions 30 of FIG. 13 and the distance between them is obtained as a reading of the indicator 38 of FIG. 14. This tensiometer adjustment is then compared with a certain norm and the difference between the two indicator readings gives the difference in distance between the holes and the norm. In this manner, this difference is ascertained for different values of Z and for the two pairs of diagonally located holes of FIG. 11.

The milling of the dash-line groove around the measuring point according to FIG. 11 is done with a drill according to FIG. 15. An annular saw drill 61 is attached by means of a band 63 to a cylindrical attachment 62, which is fastened in a drilling machine of the manually guided type. The drill is fixed centrally above the measuring point by means of the aforementioned drill fixture attached to the metal sheet. If it is not desired to ascertain the stresses throughout the entire depth of the sheet, the dash-line groove of FIG. 11 does not have to be cut through the whole width of the sheet. However, it should be made about 8 millimeters deeper than the largest Z-value. This applies to the proposed distance between the holes.

In spite of good reaming of the cylinders, they are obviously relatively uneven with regard to measurements of the high accuracy required for the present purpose. However, on account of the relatively large area of contact with the walls of the cylinders, small irregularities will have no effect. Evidently, there is some difficulty connected with placing the measuring supports at exactly the same points during the two series of measurements. If the accuracy of the measurement at each level does not surpass ±0.001 millimeter for a measuring distance of 9 millimeters, the test is satisfactory in view of the fact that the measurements are taken at accurately located levels, so that an average of greater accuracy is thus obtained. Checks have indicated the error of measurement to be of the order of ±0.001 millimeter. This corresponds to an error in the measured stress of about 2 kp./mm.$^2$, which of course in most practical cases is of no importance.

A check of the source of errors referred to above as due to the possibility of stresses being relieved by the holes themselves can be had in the following manner according to FIG. 16.

Six conical depressions, which are to serve as seats for the balls of the tensiometer, are drilled in a stressed area. The distances $b$, $c$ and $d$ are measured. Two holes of 3 millimeter diameter are then drilled through the metal sheet at the crosses in a direction at right angles to the one designated $b$. Through a renewed measurement of the distances $b$, $c$ and $d$ it may be ascertained whether these have changed because of the drilling process. The following table gives measurements according to this principle. The stresses $\sigma_b$ in the $b$-direction and $\sigma_a$ in the direction normal thereto have been ascertained afterwards through removal of the cylinder by drilling. The measured change is given in the unit of 0.001 millimeter on the distance of 9 millimeters between corresponding depressions. It is seen that the measured changes are of the same order as the measuring tolerance and can therefore be neglected.

*Table*

| Measuring point | Measurement | Measured change caused by drilling | $\sigma_a$ | $\sigma_b$ |
| --- | --- | --- | --- | --- |
| 1 | $b$ | +0.3 | | |
|   | $c$ | −0.2 | +4 | −15 |
|   | $d$ | −0.1 | | |
| 2 | $b$ | −0.4 | | |
|   | $c$ | −0.4 | +6 | −14 |
|   | $d$ | +1.2 | | |
| 3 | $b$ | +0.9 | | |
|   | $c$ | +0.9 | +9 | −4 |
|   | $d$ | +0.3 | | |

FIGS. 17 and 18 show another embodiment of the support according to FIG. 13. All the parts are in principle alike in the two figures, however, the bracket of FIG. 13 is replaced in FIGS. 17 and 18 by a pair of flattened rods 45 and 46, each of which extends through a pair of members in such a way as to prevent them from turning relative to each other but allowing mutual displacement thereof. In this case, all of the four supports are thus inserted at the same time, which makes the measuring process more convenient.

If the directions of the principal stresses are not known and it is desired to establish magnitude and direction of these stresses, three holes can be drilled with substantially the same mutual distance between them and measurements be made at three different points, or it is possible to drill six holes through the sheet at the measuring point according to FIGS. 19 and 20 and measuring the three diagonally located holes in the manner described above. If a more accurate check on the measurements is desired, it is possible to measure not only the diagonal distances between the piercing holes but also the distances between adjacent holes.

Instead of drilling a groove around the measuring point for relief of the stresses, it is possible to drill a hole 47 on the measured distances according to FIG. 21. This method requires more complicated calculations and is in some cases less accurate than the one described above.

If measurements are to be made in areas in which the stresses exhibit marked variations it may be suitable to remove the milled cylinder according to FIG. 22 on a lathe. This figure also illustrates how it is possible by drilling one or more holes 48 in the cylinder to relieve additional stresses.

If the underside of the sheet is not easily accessible, for instance, supports according to FIG. 23 may be used. A yoke 49 is provided with a pair of legs 50 and 51, which are inserted into the measuring holes 52 and 53. The legs are tubular and have at their lower ends a bottom having a conical depression 54 adapted to provide a seat for the ball of the tensiometer. The legs are furthermore provided with one or more slits 55, which cause the weight or pressure of the tensiometer to expand the lower portion of the legs so as to make contact with the walls of the holes, thereby securing the legs concentrically in the holes. Supporting flanges 56 serve to determine the distance in the vertical direction. It is suitable to provide one such supporting device for each Z-value. The two legs may also be separate, in which case care must be taken that they are in the same relative position during both measurements.

It would be possible to do entirely without supporting members if the distant ends of the legs of the measuring device were constructed so as to be expansible by means of a screw or other pressure device so as to make good contact with the wall of the corresponding hole.

In the above description of the method according to the invention and the apparatus used therefor, it was assumed that the measurements between the holes in the material were made perpendicularly to the axes of the holes. However, it is also possible to make the measurements obliquely to these axes. The supporting legs of the device shown in FIGS. 13, 17, 18 or 23 are then made of different length, as illustrated in FIG. 24. If the distances $l_1$ and $l_2$ are measured before and after the cylinder is milled out, it is possible to calculate the change in the distance $l_3$ and thus also to calculate the stress component in the direction of the lastmentioned distance. The method according to the present invention therefore makes possible the measurement of inherent stresses inside welds, for instance, not only in planes parallel with the upper surface of the weld but also in planes perpendicular thereto, i.e., the method makes possible measurements in three-dimensional planes.

What is claimed is:

1. A method of measuring stress in the interior of material comprising the steps of forming at least a pair of substantially parallel holes in the material, and measuring the distance between these holes at a plurality of levels below the surface of the material both before and after a change in stress has been applied to the material whereby the stress in the interior of the material may be determined.

2. A method of measuring stress in a member comprising the steps of forming at least a pair of substantially parallel holes in the stressed area of the member, measuring the distance between these holes at a plurality of levels below the surface of the member, forming a groove around the stressed area to relieve the stress, measuring the distance between the holes and from the difference between the first and second measurements computing the change in stress in the member.

References Cited in the file of this patent

UNITED STATES PATENTS

| | | |
|---|---|---|
| 2,028,514 | Mathar | Jan. 21, 1936 |
| 2,898,761 | Hast | Aug. 11, 1959 |

FOREIGN PATENTS

| | | |
|---|---|---|
| 151,797 | Sweden | Oct. 4, 1955 |